(No Model.)
3 Sheets—Sheet 1.
G. W. HAINES.
SULKY PLOW.
No. 396,480. Patented Jan. 22, 1889.
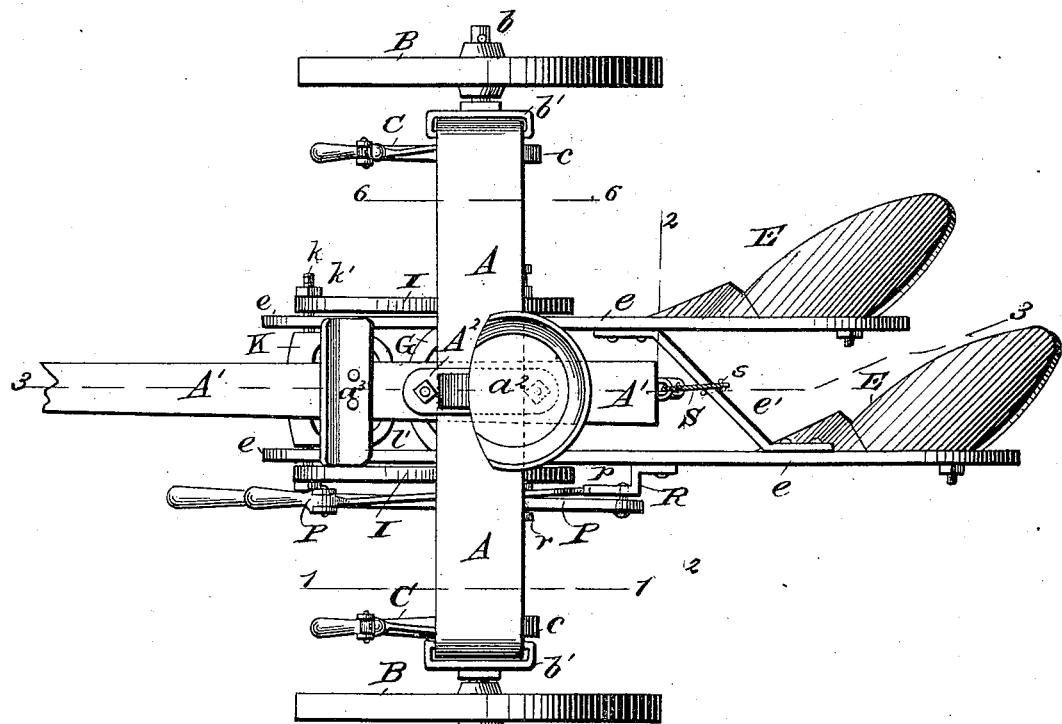
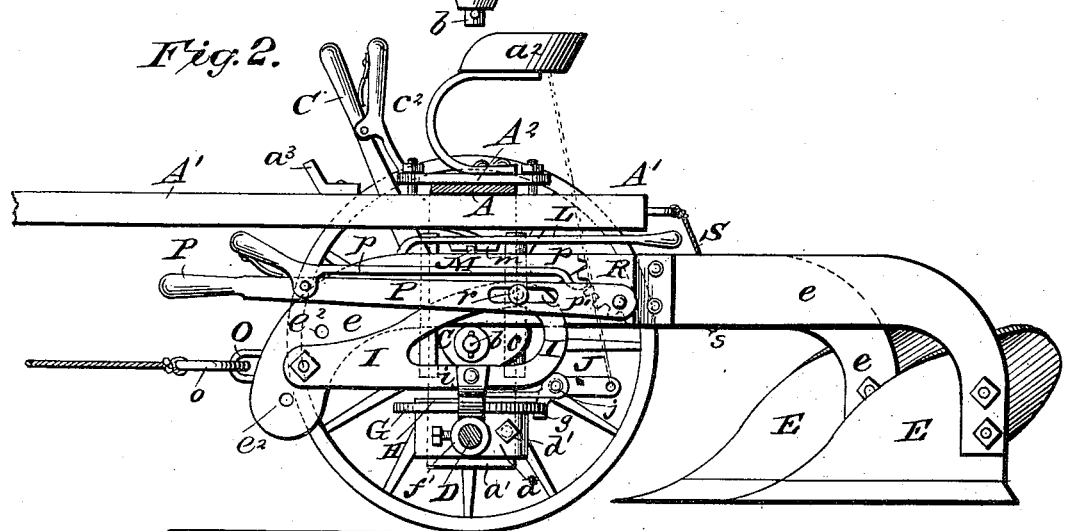
WITNESSES:
Phil. C. Dieterich.
C. Sedgwick.
INVENTOR
G. W. Haines
BY Munn & Co.
ATTORNEY (No Model.) 3 Sheets—Sheet 2.

G. W. HAINES.
SULKY PLOW.

No. 396,480. Patented Jan. 22, 1889.

WITNESSES:
Phil C. Dieterich.
C. Sedgwick

INVENTOR
G. W. Haines
BY Munn & Co.
ATTORNEY (No Model.)  3 Sheets—Sheet 3.
G. W. HAINES.
SULKY PLOW.
No. 396,480.  Patented Jan. 22, 1889.
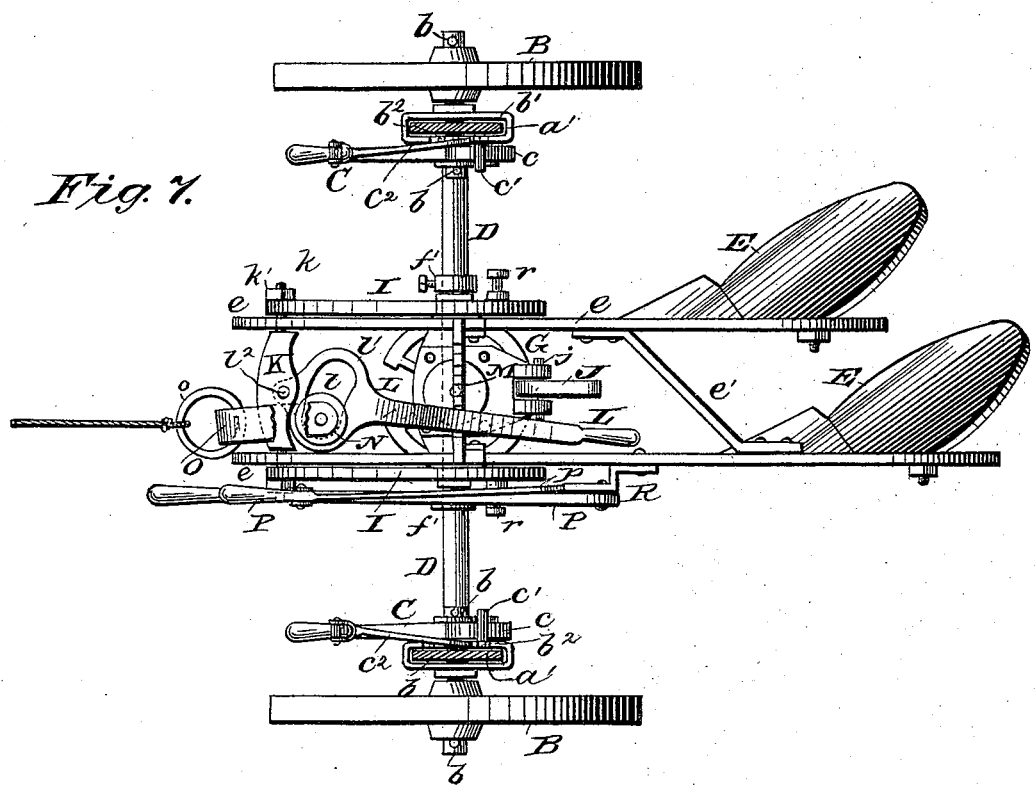
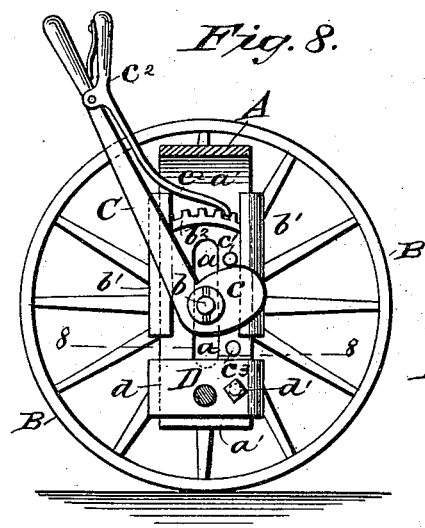
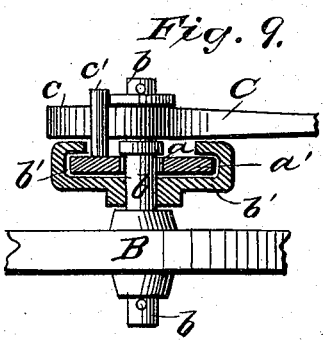
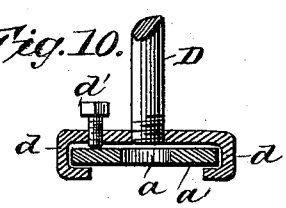
WITNESSES:
Phil C. Dieterich
C. Sedgwick
INVENTOR
G. W. Haines
BY Munn & Co.
ATTORNEY

UNITED STATES PATENT OFFICE.

GEORGE W. HAINES, OF STOCKTON, CALIFORNIA.

SULKY-PLOW.

SPECIFICATION forming part of Letters Patent No. 396,480, dated January 22, 1889.

Application filed June 12, 1888. Serial No. 276,800. (No model.)

*To all whom it may concern:*

Be it known that I, GEORGE W. HAINES, of Stockton, in the county of San Joaquin and State of California, have invented a new and Improved Sulky-Plow, of which the following is a full, clear, and exact description.

My invention relates to a sulky-plow, and has for its object to provide an efficient, durable, and readily-adjustable implement of this character adapted for a wide range of work in preparing lands to receive crops, or for road-grading, or other purposes for which an implement of this class is ordinarily used.

The invention consists in certain novel features of construction and combinations of parts of the sulky-plow, all as hereinafter described and claimed.

Reference is to be had to the accompanying drawings, forming a part of this specification, in which similar letters of reference indicate corresponding parts in all the figures.

Figure 3:
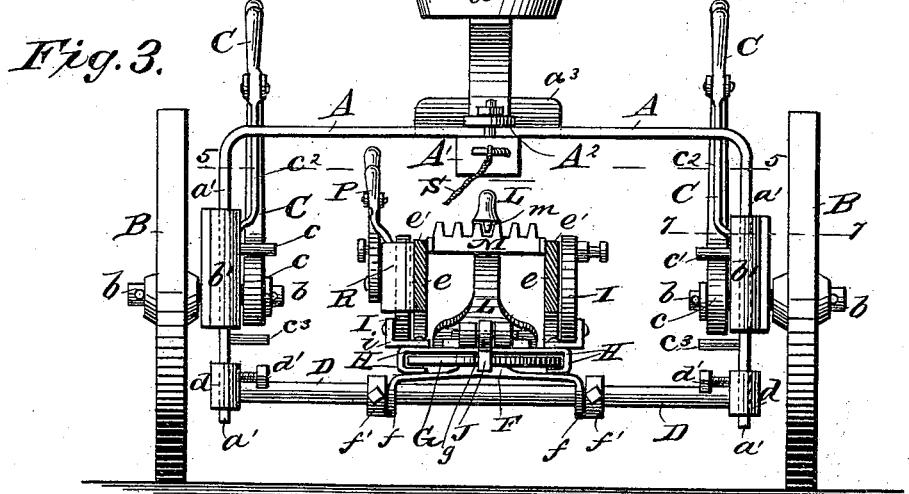
Figure 4:
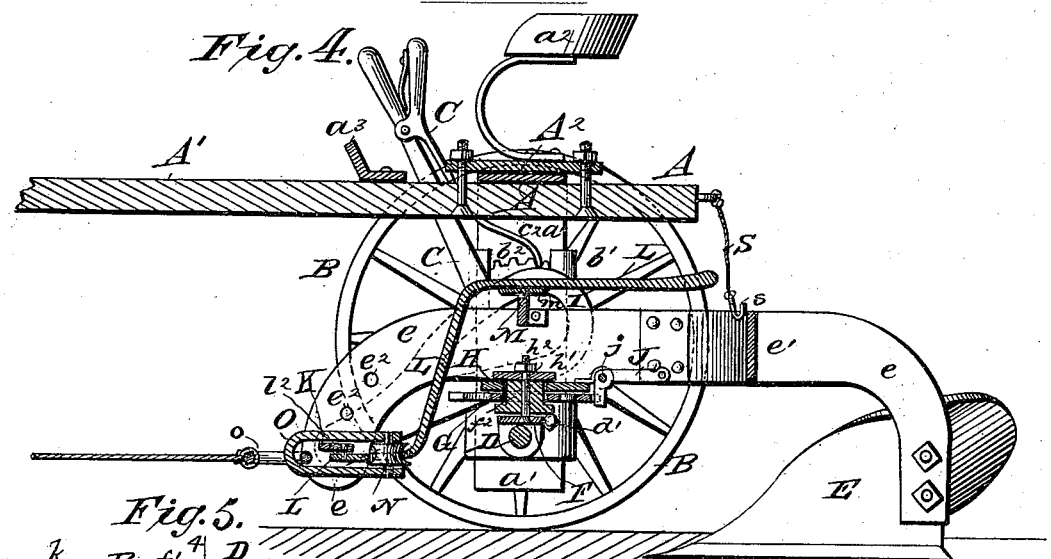
Figure 5:
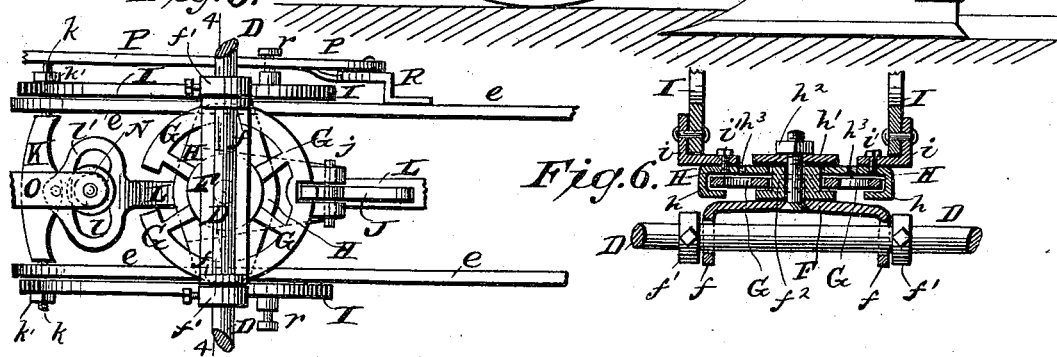
Figure 6:
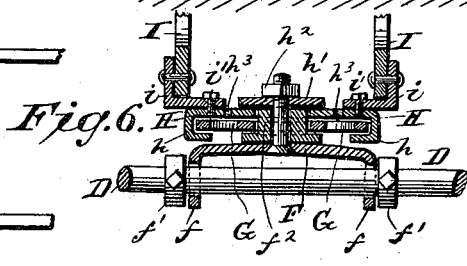

Figure 1 is a plan view of my improved sulky-plow with the pole partly broken away, and shows the machine with two plows for turning two furrows at once. Fig. 2 is a side elevation of the machine, the arched frame being in section on the line 1 1 in Fig. 1. Fig. 3 is a rear view of the machine, with parts in section on the line 2 2 in Fig. 1. Fig. 4 is a vertical longitudinal sectional elevation of the machine, taken on the line 3 3 in Fig. 1. Fig. 5 is a detail bottom plan view of the plow-beams, their supports and guides, and the draft-clevis connections. Fig. 6 is a transverse vertical section taken on the line 4 4 in Fig. 5. Fig. 7 is a plan view, with parts in horizontal section, on the line 5 5 in Fig. 3. Fig. 8 is a detail side elevation with the frame in section, on the line 6 6 in Fig. 1. Fig. 9 is a detail plan view, in horizontal section, on the line 7 7 in Fig. 3; and Fig. 10 is a detail plan view, in section, on the line 8 8 in Fig. 8.

The frame A of the machine is an arched metal bar or plate, the downbent end parts, $a'$ $a'$, of which are provided with vertical slots $a$ $a$, through which may slide the inner ends of short or stub axles $b$ $b$, on which are loosely fitted the sulky-wheels B B, one at each side of the machine. To the axles $b$ are fixed vertically-ranging guide-plates $b'$, which have inwardly-bent flanges engaging the ends $a'$ of the frame and forming guides for the wheel-plates and axles in their vertical movement. To the inner end of each of the axles $b$ is journaled a lever, C, having an eccentric or cam-head, $c$, which, as the lever is operated by the attendant on the seat $a^2$ of the frame, acts on a pin, $c'$, fixed in the adjacent vertical end $a'$ of the frame to raise the frame or to lower the wheel B, on whose axle the lever is hung relatively to the frame or the plows supported therefrom and in a manner hereinafter more fully explained. Each of the wheel-adjusting levers C is provided with a latch-lever, $c^2$, which may be engaged with a rack, $b^2$, on the axle-guide plates $b'$ to lock the frame and wheels at any required relative vertical adjustment.

Stop-pins $c^3$ may be provided on the frame ends $a'$ to limit the backward swinging movement of the cam-levers, and also to form stops to the upward movement of plates $d$ $d$, which are fitted to slide vertically upon the lower parts of the ends $a'$ of the frame and give support to a transverse shaft, D, which ranges across the machine beneath the top of the frame A and carries the plow supporting and adjusting mechanism, presently described. The shaft D may be fixed to or may be loose in the end plates, $d$ $d$, and these plates are provided with set-screws $d'$ $d'$, by which the shaft D and the connected plows may be locked to the frame when raised or lowered bodily for adjusting the plows, as hereinafter set forth.

The pole or tongue A' of the sulky is held to the frame A by a clamp-plate, A², and suitable bolts, which allows the pole to be set laterally at any required position on the frame to accommodate either two or three horses hitched to the machine, using either right or left hand plows, however the plows or their supports may be adjusted laterally on the shaft D. The driver's seat $a^2$ is shown mounted on the pole clamp-plate, and a foot-rest, $a^3$, is provided on the pole in front of the seat.

The drawings show and I will particularly describe two plows, E E, connected to the shaft D, for turning two furrows at once; but a single plow or a gang of more than two plows may be used with the machine, if desired, and their operation will be the same, provided that the beams of all the plows used are connected rigidly, substantially as the beams e e of the two plows shown are connected by a stay-bar, e', so that the plow mold-boards cut always to the one depth in the soil for which they have been adjusted.

The plows are held to the shaft D by what may be termed a "rocking" or "oscillatory" fifth-wheel connection, and as follows: A yoke or plate, F, is loosely fitted by its downbent end lugs, f f, onto the shaft D and between the collars f' f', having set-screws by which they may be fastened to the shaft to hold the yoke F at any place to which it may be adjusted along the shaft laterally of the machine to accommodate the draft-animals or the plows connected to the yoke. To a fixed upwardly-projecting lug or part, $f^2$, of the yoke F is fixed a plate, G, which may be of the skeleton form shown, and is the lower fifth-wheel plate of the plow-coupling.

Onto the hub of the yoke or plate F, and above the plate G, is loosely fitted a plate, H, which is free to turn in horizontal plane and is provided with two or more bent lips or keepers, h, which hold its outer part or margin to the periphery of the plate G. The plate H is or may be held down onto the plate G at its central part by suitable overhanging plate, h', preferably held by a bolt, $h^2$, passed through the hub of the yoke-plate F. To the laterally-extending opposite side parts of the plate H are held by screw-bolts i' i' the opposite angular lugs, i i, to which are rigidly fastened the lower parts of the higher rear ends of the opposite plates, I I, to the forward ends of which are connected the front ends of the beams e e of the plows E E, and in a manner presently explained. The lugs i may be cast with the plates I, if preferred.

The upper fifth-wheel plate, H, has a rearwardly-extending portion, to the outer end of which is pivoted on a horizontal pin, j, a latch or dog, J, which is adapted to drop into a notch, g, made at the center of the rear edge of the lower relatively stationary fifth-wheel plate, G, to lock the plate H, so it cannot turn on or above the plate G when the plows are cutting straight or comparatively straight furrows. The latch J may be disengaged from the plate G by the driver on the seat $a^2$ by means of a cord (indicated in dotted lines in Fig. 2 of the drawings,) when the plows are to turn a rather sharp curve or when the machine is to be turned around or turned sharply to one side at the ends of the furrows or at the corners of the field, the plate H then swinging around more or less on the plate G like ordinary fifth-wheel plates of vehicle running-gear, and when the plows again are in line the latch J will be allowed to engage the plate G to hold the plows against swinging laterally as they move forward to their work. The plate H is provided with a few extra holes, $h^3$, to receive the fastening-bolts i' to allow the plates I I to be adjusted in or out laterally to accommodate the widths of the plowshares held to the beams e, or, in other words, to hold the plow-beams fairly between the guide-plates I I.

Fig. 6 of the drawings clearly shows the connections between the plow-guide plates I I and the transverse shaft D of the machine.

At the forward ends of the plow-beams e e, and also in the forward ends of the guide-plates I I, are journaled the rounded reduced ends k k of a bar or plate, K, which thus is free to rock on its end bearings, which are or may be screw-threaded to receive nuts k' outside of the guide-plates to hold the plates to the outer sides of the plow-beams and hold said beams fairly to shoulders on the bar, which prevent inward movement of the beams and hold them parallel with each other. To the center of the rocking bar K is pivoted at $l^2$ the front transversely-slotted end or head, l', of a lever, L, which extends rearward across a transverse rack-bar, M, fixed to the opposite plow-beams, e e, and in reach of the driver, and is provided with a projection or lip, m, adapted to engage the rack at any point. In the transverse slot l of the head of the lever L is fitted a roller, N, which normally runs on the concaved front edge or wall of the slot l and is journaled to the inner end of a clevis, O, to which is attached a ring, o, to which the horses will be hitched for drawing the machine forward.

It is manifest that when the lip m of the lever L is set into the center notch of the rack-bar M the lever will then extend about parallel lengthwise with the plow-beams and the clevis-roller N will pull directly at the center of the front wall of the slot l of the lever L, as shown in Fig. 5 of the drawings, and there will be no side draft on the plows, which then will move straight ahead, as is desirable when the plows are cutting a furrow or furrows of proper and uniform width; but if for any cause the plows should run out or take too much land and turn too wide furrows the back end of the lever L will be shifted toward the land more or less, and will be again engaged with the rack-bar M to hold the front wall of the lever-slot l inclined to cause the clevis-roller N to run toward the land, as shown in Fig. 7 of the drawings, and thus cause outward side draft on the plows to make them take less land, as may be required.

Should the plows take too little land and turn too narrow furrows, the lever L will be shifted from the center of the rack-bar M toward its outer end or from the land more or less, which will incline the front wall of the lever-slot l to cause the clevis to run on it from the land and cause the plows to take more land until the proper width of furrows is secured. By thus manipulating the lever L the draft on the machine may be regulated to a nicety and while the machine is moving forward to cause the plow or plows to take or leave land to cut furrows of any desired width.

The plow-beams e e are preferably provided at their forward ends with a series of holes, $e^2$, to receive the bearings $k$ of the draft-connection bar K, thus allowing the bar, the clevis, and the front end of the draft-regulating lever L to be set higher or lower on the plow-beams. When the end supports, $d$, of the shaft D are adjusted low down on the pendent ends $a'$ of the frame A, and when the clevis-bar K is adjusted in higher holes $e^2$ of the plow-beams, it is obvious that the beams will be entirely clear of the fifth-wheel plate H of the plow-coupling and the plows will be free to rise and fall to conform to irregularities of the ground surface and entirely independent of the sulky-wheels. In other words, the plows will be free to work to a uniform depth for which they had been set to work by a lever, P, presently described, substantially as plows work when held by hand, only that the sulky and the guide-plates I I hold the plows more steadily to their work by preventing sidewise tipping or tilting of them in the ground. When the clevis-bar K is set into lower holes $e^2$ of the plow-beams and the shaft D is raised by setting its bearings $d$ higher on the frame ends $a'$, the fifth-wheel coupling-plate H will then lie flat against the lower edges of the plow-beams, as shown in Fig. 4 of the drawings, and the depth of working of the plows will then be controlled or gaged by the sulky-wheels, as the plows cannot then rise and fall independently of the wheels.

I wish it to be understood that the series of holes $e^2$ in the plow-beams are not essential to the adjustment of the plows to working depth independently of the wheels, or so that their working depth is controlled by the wheels, as the vertical adjustment of the shaft D would of itself accomplish this with but one point of connection of the draft-clevis with the beams; but by providing the series of higher and lower holes $e^2$ in the plow-beams the working depth of the plows when running independently of the wheels may be more easily regulated by lowering or raising the clevis-bar K in the plow-beams in connection with the adjustments of the lever P, presently described.

The lever P is pivotally connected at its rear end to a rack plate or bar, R, which is fixed to one of the plow-beams, and the lever extends forward in reach of the driver on the seat $a^2$, and is provided with a lengthwise slot, $p'$, through which a pin, $r$, passes into the adjacent guide-plate I. The lever has an ordinary spring-pressed latch-bar, $p$, which may be engaged with any one of the series of notches in the rack R. It is obvious that after disengaging the latch-bar $p$ from the rack R the lever P may be rocked on its fulcrum $r$ to raise or lower the plows E and set them to work at any required depth as the machine is drawn forward by the clevis O, and in hard ground the plows may be prevented from jumping by the driver grasping the lever P and holding or pulling upon it to throw the weight of the sulky onto the plows.

It will be noticed that the rocking bar K permits all the aforesaid adjustments of the plow-beams and plows without interfering with the free action of the clevis however it may be adjusted. If desired, a lever, P, may be fitted at each of the plow-guide plates I, which have like fulcrum pins or studs to receive the levers. (See Fig. 7 of the drawings.)

The plows may be held up clear of the ground when the machine is on the road or is out of use by engaging a hook, $s$, on a cord, S, held to the pole, with the cross-bar $e'$ connecting the two plow-beams $e\ e$, and as will be seen in Figs. 1 and 2 of the drawings.

When the machine is fitted with right-hand plows, as shown in the drawings, the right-hand wheel B will run in a furrow and the left-hand wheel B, then running on the land, will be raised by operating the adjacent cam-lever C, in a manner hereinbefore described, for a height equaling the depth of the furrows cut by the plows, and when left-hand plows are used the right-hand or land wheel will then be raised by its adjacent lever C, or one of the wheels may be raised and the other lowered to accommodate any depth of working of either right or left hand plows, as will readily be understood.

Having thus described my invention, what I claim as new, and desire to secure by Letters Patent, is—

1. In a sulky-plow, the combination, with the frame and a transverse shaft held thereto and vertically adjustable thereon, of a rocking support on said shaft, guide-plates held to said support, a plow or plows having beams extending next the guide-plates, a bar or plate connecting said guide-plates and also connecting the forward ends of the plow-beams, and a draft attachment connected to said bar or plate, substantially as shown and described, whereby the plows may be adjusted to working depth independently of the sulky-wheels, or so that their depth of working may be controlled by or from the wheels, as herein set forth.

2. In a sulky-plow, the combination, with the frame and a transverse shaft held thereto and vertically adjustable thereon, of a rocking support on said shaft, guide-plates held to said support, a plow or plows having beams extending next the guide-plates, and a bar or plate connecting said guide-plates and also connecting the forward ends of the plow-beams, and said beams having a series of holes to receive the bar or plates, substantially as described, for the purposes set forth.

3. In a sulky-plow, the combination, with the frame, a transverse shaft thereon, a fifth-wheel plate-coupling supported on said shaft, opposite parallel guide-plates held to said coupling and receiving the plow-beams between them, a bar connecting the forward ends of the beams and guide-plates, and a draft device connected to the plow-beams, substantially as herein set forth.

4. In a sulky-plow, the combination, with the frame A, of a shaft, D, vertically adjustable on the frame, a fifth-wheel coupling, G H, hung on said shaft, a latch, J, for said coupling, guide-plates I I, held to the coupling-plate H, a plow or plows having a beam or beams ranging along the plates I I, a cross bar or plate, K, loosely connecting the plow-beams and guide-plates, and a draft device held to the bar K, substantially as described, for the purposes set forth.

5. In a sulky-plow, the combination, with a frame, a transverse shaft thereon, a rocking support on said shaft, guide-plates held to said support, and a plow or plows having beams ranging along said plate or plates and connected thereto at the forward end, of a rack, R, on the guide-plate, a lever, P, slotted at $p'$ and fulcrumed on a pin, $r$, passed through the slot $p'$ into the guide-plate, and a latch on the lever adapted to the rack R, substantially as herein set forth.

6. In a sulky-plow, the combination, with the frame, a support thereon, and a plow or plows held to said support, of a draft-bar fitted to the plow beam or beams, a lever having a transverse slot or cross-head at its forward end and pivoted thereat to the draft-bar, a draft-clevis fitted to slide transversely on the lever-head, and a detent for the lever, substantially as shown and described, whereby by shifting the lever the clevis will automatically adjust itself to secure any required side draft of the plows, as herein set forth.

7. In a sulky-plow, the combination, with the frame, a transverse shaft thereon, a rocking support on said shaft, a plow or plows held to said support and provided with a series of upper and lower draft-holes at their forward ends, a rocking bar, as K, adapted to said draft-holes, a lever, L, having a slot, $l$, and pivoted to the bar K, a rack on the plows with which the lever is adapted to lock, and a draft-clevis fitted to slide transversely in the lever-slot $l$, substantially as herein set forth.

8. In a sulky-plow, the combination, with the frame, a transverse shaft, D, thereon, a rocking support on said shaft, plates I I, held to said support, a plow or plows having beams held between the plates I I, and provided with a rack, M, a rocking bar or plate, K, held to the plow-beams and to the plates I, a lever, L, having a head-slot, $l$, and pivoted to the bar K, and a laterally-movable draft-clevis, as N O, fitted to the lever L at its slot $l$ and adapted to engage the rack M, substantially as described, for the purposes set forth.

GEORGE W. HAINES.

Witnesses:
E. A. WILLIAMS,
E. BUTTERS.